«2,791,613»

METAHALOANILINE PRODUCTION USING COPPER OXIDE-CHROMIC OXIDE CATALYSTS

Blaine O. Pray, Wadsworth, and Fred C. Trager, Akron, Ohio, assignors to Columbia-Southern Chemical Corporation No Drawing. Application August 24, 1953,
Serial No. 376,235

10 Claims. (Cl. 260—580)

This invention pertains to an improved process for converting halonitrobenzenes to their corresponding haloanilines with hydrogen. More particularly, it relates to such conversions at temperatures above about 150° C., and preferably above about 180° C., wherein only a minimum amount of dehalogenation is encountered.

It has been generally recognized that nitrobenzene, for example, may be treated with hydrogen under appropriate conditions to provide aniline. However, such processes are not generally suitable for converting halonitrobenzenes to haloanilines, primarily because considerable dehalogenation accompanies the reduction reaction. Thus, sizeable losses of the desired product, a haloaniline, have been incurred due to the formation of unhalogenated anilines.

It has now been discovered, according to this invention, that this undesirable dehalogenation may be suppressed and even avoided by converting halonitrobenzenes to haloanilines with hydrogen at temperatures of above about 150° C., preferably above 180° C., in the presence of copper oxide-chromic oxide type catalysts. Practice of this invention therefor makes it possible to obtain high yields of haloanilines from halonitrobenzenes without producing significant quantities of unhalogenated arylamines, notably anilines.

Those copper oxide-chromic oxide catalysts contemplated by this invention which promote the desired conversion without also apparently simultaneously causing dehalogenation may be represented as follows:

$$[CuO]_x[Cr_2O_3]_y$$

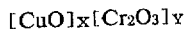

wherein X and Y are values from 0 to 1 inclusive, and both X and Y are not 0. That is, at least one subscript (X or Y) is a value greater than zero. Thus, suitable catalysts include those containing as their catalytically active ingredient only cupric oxide or only chromic oxide, or any combination of the two oxides. Preferred catalysts are those in which cupric oxide comprises at least a major portion of the catalytically active ingredient, such as when the catalyst contains at least 2 moles of CuO per mole of $Cr_2O_3$.

In use, the actual catalyst composition may contain other components, which as far as understood, merely serve to improve the physical properties of the catalyst, e. g. serve as binders to reduce deterioration from physical means. Some such typical components are sodium silicate and graphite, or other forms of carbon. These materials usually comprise a minor portion of the catalyst; for example, they often comprise between about 5 and 25 percent by weight of the total composition.

Besides requiring a particular catalyst, the invention further requires operation at temperatures in excess of 150° C., more notably about 180° C. At temperatures below about 150° C., these catalysts do not appear to be effective, either in suppressing dehalogenation or promoting the reaction. Temperatures up to a least 400° C., and even higher are quite satisfactory.

To operate at the required temperatures, the reaction is performed either in the liquid phase under superatmospheric pressures or in the gas phase. The former process requires pressures of at least about 400 pounds per square inch gauge and higher with pressures of 1500 to 2000 pounds per square inch, for example, being most frequently used.

Haloanilines are therefore prepared in accordance with this invention, for example, by passing elemental hydrogen into a liquid reaction mixture of a halonitrobenzene containing a catalytic quantity of the cupric oxide-chromic oxide catalyst while maintaining the solution under superatmospheric pressure and at a temperature of at least 150° C. This may be accomplished by charging an autoclave, or other equivalent apparatus, with a halonitrobenzene and catalyst and raising the temperature while placing a superatmospheric pressure on the system. Gaseous hydrogen at suitable pressure may then be introduced into the autoclave.

Suitable catalyst concentrations depend to some extent on the specific activity of each catalyst and therefore may vary widely. Even traces of the requisite catalyst will promote the reaction, although the rate may not be as great as when higher catalyst concentrations are present. Concentrations of between 0.1 and 2.0 percent of the catalytic composition by weight of the halonitrobenzene are most suitable, but even larger amounts are satisfactory.

The liquid phase reaction is facilitated by incorporating a suitable inert organic solvent in the reaction medium which has an affinity towards dissolving hydrogen and the halonitrobenzene, particularly within the contemplated temperatures. Among the suitable solvents are the lower monohydric alcohols containing as many as 10 carbon atoms, preferably these containing 1 to 5 carbon atoms such as methanol, ethanol, isopropanol, n-butanol and amyl alcohol; benzene; xylene; cyclohexane; Cellosolve; and the haloaniline corresponding to the reduction product of the halonitrobenzene. Alcoholic media are preferably used when the halonitrobenzene has a halogen atom in the meta position. Other similar organic solvents which are chemically inert under reaction conditions and which dissolve hydrogen may be used.

Mixtures which contain from about 10 to 90 percent solvent by weight of the solvent and halonitrobenzene at the outset of the reaction period are adequate, although even higher solvent concentrations are operable. For the most part, a solvent concentration of between 30 and 75 percent is recommended.

One limitation on the minimum solvent concentration insofar as performance of the invention under suitable conditions is concerned, is the requirement that sufficient solvent be employed to preclude the formation of a distinct aqueous phase as the reaction proceeds. There is a tendency for the catalyst to accumulate in such an aqueous phase, rather than to remain in the organic phase where it is effective. This possibility is avoided by using a reaction mixture which contains, for instance, at least 10 percent alcohol by weight at the outset of the reaction.

At least sufficient hydrogen is employed to achieve complete reduction of the —$NO_2$ group to —$NH_2$. Thus, at least 3 moles of hydrogen per mole of halonitrobenzene are charged to the reaction medium. More often, however, greater quantities of hydrogen are dissolved than are theoretically required. Mole excesses of at least 50 to 100 percent are frequently employed.

The following examples illustrate the manner in which this invention may be performed in the liquid phase.

Example 1

The apparatus employed for the hydrogenation included a reaction vessel (bomb) having a volume of 183 cubic centimeters. In operation, this vessel was mounted in a rocking autoclave which was electrically heated. A combination valve was employed which contained a pressure gauge, rupture disc and inlet connection to the vessel. This inlet was connected with a high pressure, stainless steel coil to a high pressure delivery, constant pressure regulator, which in turn was connected, via suitable high pressure tubing and valves, to a hydrogen reservoir, a nitrogen cylinder and a hydrogen cylinder. The hydrogen reservoir was a vessel with a volume of 1150 cubic centimeters.

Procedurally, the solvent, metachloronitrobenzene and the catalyst were placed in the reaction vessel; the vessel was closed, placed in the electrical heating jacket and connected to the fittings. Nitrogen at 200 pounds per square inch gauge was passed through the reaction vessel (bomb) and then hydrogen was passed through with no hydrogen pressure in the bomb. Then the temperature was raised to the desired value.

Hydrogen, thereafter, was admitted to the reservoir from the hydrogen cylinder and the reservoir was isolated from the cylinder. Hydrogen, at a constant pressure, was introduced into the bomb by means of the constant pressure regulator. Agitation of the contents of the bomb was achieved by actuating the rocking mechanism while the temperature was maintained at ±1° C. of the desired value.

At the conclusion of the reaction, the bomb was isolated from the system and cooled in a stream of air after venting the residual hydrogen. When it reached room temperature, it was vented and then opened.

The products were recovered by washing the bomb with solvent and the catalyst removed by suction filtration. By distillation from a steam bath through a one-plate column, the solvent was removed. Nitrogen was bubbled through the liquid to prevent bumping during distillation.

After bringing the liquid residue to a pH of about 8.5 by adding 200–300 cubic centimeters of aqueous saturated sodium bicarbonate solution, the mixture was steam distilled until no more oil came over, a weight ratio of water to product of 20 to 1 being used.

Three times the steam distillate was extracted with 50 cubic centimeter portions of methylene chloride. The organic layer was dried with anhydrous sodium sulfate and the methylene chloride was removed by steam bath distillation. The final traces of methylene chloride were removed at a pressure of 30 millimeters of mercury. The thusly obtained product was weighed and its composition determined by infra red analysis. The pot residue was also analyzed.

Following the above procedure a series of runs were made employing:

31.5 grams (0.2) meta-chloronitrobenzene
2.6 grams of catalyst (as listed in Table I)
68.5 grams of absolute ethanol Table I hereinafter lists the operational conditions and results:

TABLE I

| Catalyst | Pressure (p. s. i. g.) | Temp. (° C.) | Reaction Time (Hours) | Yield, meta-chloro-aniline | Aniline,[2] mole percent |
|---|---|---|---|---|---|
| CuO[1] | 1,000 | 150 | 2.5 | 94.8 | 1.9 |
| $\frac{CuO}{Cr_2O_3}$ =1.39 | 1,725–1,515 | 200 | 3.0 | 88.3 | 2.0 |
| $\frac{CuO}{Cr_2O_3}$ =2.3 | 1,500 | 200 | 1.2 | 71.6 | 0.8 |
| $\frac{CuO}{Cr_2O_3}$ =2.8 | 1,500 | 200 | 1.5 | 63.5 | 0.8 |
| $\frac{CuO}{Cr_2O_3}$ =10.5 | 500 | 150 | 0.5 | 93.3 | 1.0 |

[1] These were ⅛-inch hard black tablets having 77% CuO, 5% $Na_2O$, 15% $SiO_2$ and 2.4% graphite. The ratio of cupric oxide to chromic oxide is the mole ratio.
[2] Mole percent of product.

*Example II*

Following the procedure of Example I and using the same apparatus, a series of experiments were performed with varying reaction conditions, e. g. temperature, pressure, and solvent. The catalyst employed was a mixture of cupric oxide-chromic oxide having a bulk density of 0.87 gram per milliliter. It was a fine black powder (98–99% passing through 325 mesh) and had a mole ratio of CuO to $Cr_2O_3$ of 10.5 to 1. The quantities used in Example 1 were also employed.

Table II–A shows various experiments and results that were performed using different solvents. Eighty-seven cubic centimeters of each solvent was used.

TABLE II–A

| Pressure (p. s. i. g.) | Temp. (° C.) | Reaction Time (Hours) | Solvent | Meta-chloro-aniline yield (percent) | Aniline in Product (Mole percent) |
|---|---|---|---|---|---|
| 1,500 | 200 | 5.0 | Metachloroaniline | 73.8 | 2.8 |
| 1,500 | 200 | 3.0 | Methanol | 89.6 | 4.2 |
| 1,500 | 200 | 3.0 | Ethanol | 91.5 | 3.8 |
| 1,500 | 200 | 3.0 | Isopropanol | 95.8 | 1.1 |
| 1,500 | 200 | 6.0 | Benzene | 96.2 | 0.0 |
| 1,000 | 175 | 3.0 | Methanol | 77.7 | 2.8 |
| 1,000 | 175 | 3.0 | Ethanol | 92.8 | 2.7 |

Table II–B gives the results of another series of performed experiments wherein the temperature was varied for a constant reaction period of three hours.

TABLE II–B

| Pressure (p. s. i. g.) | Solvent | Temp. (° C.) | Meta-Chloro-aniline Yield (percent) | Aniline in Product (Mole percent) |
|---|---|---|---|---|
| 1,000 | $CH_3OH$ | 150 | 75.7 | 2.8 |
| 1,000 | $CH_3OH$ | 175 | 77.7 | 2.8 |
| 1,000 | $CH_3OH$ | 200 | 83.2 | 3.7 |
| 1,000 | $CH_3OH$ | 225 | 80.1 | 6.9 |
| 1,000 | $C_2H_5OH$ | 150 | 64.4 | 1.0 |
| 1,000 | $C_2H_5OH$ | 175 | 92.8 | 2.7 |
| 1,000 | $C_2H_5OH$ | 200 | 90.4 | 3.1 |
| 1,500 | $C_2H_5OH$ | 150 | 90.8 | 2.1 |
| 1,500 | $C_2H_5OH$ | 200 | 91.5 | 3.8 |

Table II–C tabulates the data from experiments carried out while varying the pressure at a reaction temperature of 200° C. and using ethanol as the solvent.

TABLE II–C

| Pressure (p. s. i. g.) | Reaction Time, Hours | Meta-chloro-aniline Yield (percent) | Aniline in Product (Mole percent) |
|---|---|---|---|
| 500 | 9.5 | 87.7 | 1.0 |
| 750 | 3.0 | 87.8 | 3.4 |
| 1,000 | 1.75 | 90.0 | 3.5 |
| 1,000 | 3.0 | 90.4 | 3.1 |
| 1,500 | 3.0 | 91.5 | 3.8 |

Another run was made to demonstrate that the catalyst could be re-used. Once used catalyst plus 20 percent make-up was employed in this particular experiment at a temperature of 200° C. and a pressure of 1500 pounds per square inch. The total reaction period was 3 hours. A metachloroaniline yield of 94.2 percent was obtained; the product contained 1.6 mole percent aniline.

As already indicated, the invention may be practiced in the vapor phase by passing halonitrobenzene vapors and gaseous hydrogen through a reaction zone containing the contemplated cupric oxide-chromic oxide catalysts. This is accomplished by providing a zone which is packed with pellets, tablets or beads of the catalyst, or even more finely divided particles of the catalyst, heating the zone to a temperature of about 180° C. or higher and passing gaseous hydrogen and a gaseous halonitrobenzene through such packing. By correlating the rate of feed through the zone to provide an adequate contact period, e. g. between 1 to 10 seconds, essentially complete conversion of the halonitrobenzene to its haloaniline counterpart is accomplished.

The reactants are fed to the packed area such that they are present in at least the stoichiometric quantities required by the reaction. At least approximately 3 moles of hydrogen per mole of halonitrobenzene are therefore introduced; however, excess hydrogen is required to be present in the zone for optimum conditions. Provision of 20 to 65 moles of hydrogen per mole of halonitrobenzene in the gas stream entering the zone is preferred.

In the vapor phase reaction, it has been found that increased temperatures favor more complete conversion; to this end, temperatures of as high as 300–400° C. and higher are often utilized. Essentially complete conversion to the haloaniline has the advantage of facilitating recovery of a high grade product.

Diluents are also incorporated in the feeds to enhance the performance of the reaction in the gas phase. Among suitable diluents are the hereinbefore enumerated solvents employed in the liquid phase process such as benzene, alcohols, etc. They are, of course, employed in their gaseous state. Besides such diluents, steam may be employed as well as other inerts including nitrogen, neon, etc.

Fairly large quantities of gaseous diluent are usually included. For each mole of halonitrobenzene which is introduced into the reaction zone, at least about 10 moles of diluent is also employed. Often the diluent comprises a considerably larger proportion of the gases, e. g. up to 100 or more moles of diluent per mole of halonitrobenzene. A typical preferred range is from 30 to 80 moles of diluent per mole of halonitrobenzene.

According to a further embodiment of this invention, it has been discovered that it is advantageous to perform the gas phase hydrogenation of halonitrobenzene to a haloaniline by using the catalyst over extended periods of time. Thus, for example, it has been found advisable to continuously employ the same bed of catalyst for periods in excess of six hours, such as several days.

The preferred mode of operating in the gas phase, therefore, involves continuously passing the gases, hydrogen, halonitrobenzene and diluent, through a suitable catalyst for lengthy periods, notably for at least 10 hours or more. Evidently, the catalyst becomes conditioned during the earlier portion of the continuous operation, generally in the first six hours of the process, and its efficiency is enhanced once that period has passed.

The following examples illustrate the manner in which the invention may be performed in the gas phase.

*Example III*

A vertically disposed glass tube about 70 centimeters in height and having an outer diameter of 18 millimeters was employed as the preheating and reaction zone. Inlet means at the top of the tube was provided for introducing vaporized metachloronitrobenzene and hydrogen. The bottommost portion was connected to an absorption tower having an outer diameter of 28 millimeters, and packed with glass beads for about 51.5 centimeters of its length.

Preheating was provided by a furnace which surrounded the upper portion of the tube. Except for a space at the uppermost part of the tower, the preheating zone constituted the top 29.5 centimeters of the tube. Glass beads were packed in this zone.

Immediately below the glass bead packing, the catalyst, in the form of small tablets (⅛ inch), was placed. Approximately 24.4 centimeters of the tube was packed with the catalyst. Nichrome wire spirally wrapped around this portion provided means of heating. From the bottom of this catalyst bed to 3.3 centimeters from the lowermost extremity of this tube, a packing of glass helices was used.

Temperatures within these packings were obtained via thermocouples inserted in a glass tube which was centrally placed within the packings.

Above the packing in the absorption tower an exit vent was provided whereby the scrubbed gases could leave the system. A separatory funnel was connected to the uppermost portion of the tower (above the vent) and was filled with methylene chloride. Via tubing and a stopcock, the lowermost portion of the tower was connected to a glass collection vessel.

Procedurally, these experiments were performed by heating metachloronitrobenzene in a vaporizer until it had melted. Thereafter the vaporizer was inserted in an oil bath and connected via appropriate tubing to the top of the tube. Meanwhile, the oil bath's temperature was brought to the desired value, and the pre-heat and catalyst heaters were turned on.

With the vaporizer connected, hydrogen was passed directly through the heated packings and catalyst for 0.5 to 1.0 hour. Then the hydrogen feed was directed through the hot metachlorobenzene and both these reactants were fed into the uppermost portion of the vertically disposed glass tube. Water, which was vaporized from a pre-weighed reservoir, was also simultaneously introduced into the top of the tube. The methylene chloride was fed slowly through the absorption tube.

After operating for the desired time, the water input and hydrogen flow was halted and plain hydrogen was directed through the zone for another 20 to 30 minutes whereafter the apparatus was cooled.

Obtaining the respective weights of the metachloronitrobenzene and water reservoirs, before and after the experiments, made it possible to determine the rates at which they were fed.

All the absorption tower drainings, plus solvent and water rinses of the tower, were placed in a separatory funnel and the methylene chloride layer was separated. Sodium bicarbonate was added to the remaining aqueous phase, and it was extracted with three 50 cubic centimeter portions of methylene chloride and one of diethyl ether.

These solvent extracts plus the methylene chloride previously separated were combined and dried over anhydrous sodium sulphate and distilled to remove most of the methylene chloride solvent. Last traces of the solvent were removed by heating the distillation residue on a steam bath and topping at a pressure of 50 to 60 millimeters of mercury for about 15 minutes. The remaining product was analyzed for its contents by infra-red technique.

Table III, hereinafter, summarizes the various specific operating conditions and results for a series of experiments performed as described above:

TABLE III

| Moles per Mole of Chloronitrobenzene | | Catalyst, Spread | Temp., °C., Ave.[1] | Contact Time, Minutes[2] | Catalyst, Age[3] | Metachloroaniline, Yield, Mole Percent | Aniline Yield, Mole Percent |
|---|---|---|---|---|---|---|---|
| H₂O | H₂ | | | | | | |
| 64.3 | 59.6 | 297–337 | 318 | 2.59 | A (2) | 91.0 | 3.7 |
| 9.8 | 3.4 | 274–451 | 315 | 2.47 | A (1) | 68.6 | 2.9 |
| 21.4 | 6.6 | 280–343 | 320 | 2.33 | A (2) | 82.5 | 3.1 |
| 39.8 | 12.2 | 281–341 | 313 | 2.38 | A (3) | 84.8 | 5.3 |
| 52.5 | 15.6 | 287–331 | 312 | 2.26 | B (2) | 86.6 | 1.4 |
| 49.8 | 15.8 | 288–339 | 320 | 2.36 | B (1) | 93.0 | 3.8 |
| 45.8 | 14.8 | 322–377 | 352 | 2.39 | B (3) | 94.0 | 3.2 |
| 52.3 | 10.5 | 302–376 | 352 | 2.36 | B (5) | 89.2 | 4.7 |

[1] Average is based on observed temperature patterns in bed, not the mean.
[2] Contact time is expressed as the time required for 1 liter of reactants (calculated to 0° C. and 760 mm.) to pass one liter (bulk volume) of catalyst.
[3] Number of times catalyst is used including the tabulated run.
Analysis catalyst A:
  CuO=36.3% by weight.
  Cr₂O₃=50.0% by weight.
  SiO₂=8.1% by weight.
  Na₂O=2.6% by weight.
Analysis catalyst B:
  CuO=77% by weight.
  Na₂O=5% by weight.
  SiO₂=15% by weight.
  Graphite=3% by weight.

Example IV

Employing the procedure and apparatus of Example III, an experiment was performed wherein the process was practiced continuously for 36 hours in that the same catalyst, a cupric oxide catalyst having the same analysis as catalyst B, hereinbefore.

The products obtained every two hours were individually collected, and as indicated, either separately analyzed for their composition or intermixed with others to get an overall picture. Table IV provides this data.

For this run the following conditions were present:

Feed ratio—40 moles H₂O; 12.4 moles H₂ per mole metachloronitrobenzene
Contact time—2.34 seconds
Total metachloronitrobenzene—233.4 grams
Average rate of metachloronitrobenzene input—12.97 grams every 2 hours

TABLE IV

| Hours of Operation | 6–8 | 8–10 | 10–12 | 12–14 | 14–16 | 16–18 | 18–20 | 20–22 | 22–24 | 24–26 | 26–28 | 28–30 | 30–32 | 32–34 | 34–36 |
|---|---|---|---|---|---|---|---|---|---|---|---|---|---|---|---|
| Catalyst Temp., °C.: | | | | | | | | | | | | | | | |
| Maximum | 353 | 352 | 352 | 352 | 353 | 352 | 353 | 350 | 352 | 352 | 349 | 349 | 349 | 344 | 344 |
| Minimum | 297 | 295 | 293 | 293 | 301 | 295 | 292 | 294 | 293 | 299 | 299 | 300 | 296 | 295 | 289 |
| Average | | 323 | | 324 | | 327 | | 324 | | 328 | | 328 | | 325 | 325 |
| Infra-red Analysis: | | | | | | | | | | | | | | | |
| Metachloroaniline, Percent | 0.0 | 0.0 | 1 | 0.0 | 1 | 0.0 | 1 | 0.0 | 1 | 0.0 | 1 | 0.0 | 1 | 0.0 | 0.0 |
| Metachloronitrobenzene, Percent | 98.4 | 95.0 | | 97.0 | | 97.4 | | 97.8 | | 95.4 | | 97.2 | | 96.0 | 96.2 |
| Aniline, Percent | 2.4 | 2.8 | | 2.6 | | 2.4 | | 2.6 | | 2.4 | | 1.8 | | 1.8 | 2.0 |

1. These portions were combined before work up. Infra-red analysis: metachloronitrobenzene, 0.0%; metachloroaniline, 98.6%; aniline, 2.0%; total, 100.6%.

The composite analysis of the entire product was:

| | Percent |
|---|---|
| Metachloronitrobenzene | 0.0 |
| Metachloroaniline | 97.6 |
| Aniline | 2.6 |

Halonitrobenzenes which may be converted to their corresponding haloanilines include monohalonitrobenzenes as well as polyhalonitrobenzenes. Also halopolynitrobenzenes may be used. Preferred reactants are mono-chloronitrobenzenes, notably para-chloronitrobenzene, meta-chloronitrobenzene and ortho-chloronitrobenzene. Corresponding bromonitrobenzenes and other halonitrobenzenes are also useful.

Although this invention has been described with reference to specific details of certain embodiments, such details are not to be construed as imposing limitations upon the scope of the inventtion except insofar as they are recited in the appended claims.

We claim:

1. A method of converting a metahalonitrobenzene to its corresponding meta haloaniline which comprises treating the halonitrobenzene with hydrogen at a temperature above 150° C. in the presence of catalytic quantities of a catalyst having the following composition:

$$[CuO]_X \cdot [Cr_2O_3]_Y$$

wherein X and Y are any value from 0 to 1 inclusive, and at least one said subscript being a value greater than zero whereby to obtain a reaction mixture containing less than 7 mole percent demetahalogenated aniline product based on the metahaloaniline product of said demetahalogenated product.

2. A method of converting a metachloronitrobenzene to its corresponding meta-chloroaniline which comprises treating the metachloronitrobenzene with hydrogen at a temperature above 150° C. in the presence of a catalytic quantity of a catalyst having the following composition:

$$[CuO]_X \cdot [Cr_2O_3]_Y$$

wherein X and Y are any value from 0 to 1 inclusive, and at least one of said subscripts is a value greater than zero whereby to obtain a reaction mixture containing less than 7 mole percent demetachlorinated aniline product based on the metachloroaniline and said demetachlorinated product.

3. A method of preparing a meta haloaniline from its corresponding meta halonitrobenzene which comprises introducing hydrogen into liquid meta halonitrobenzene under superatmospheric pressure at a temperature above 150° C., said liquid containing a catalytic quantity of a catalyst of the following composition:

$$[CuO]_X \cdot [Cr_2O_3]_Y$$

wherein X and Y are any value from 0 to 1 inclusive, and at least one of said subscripts is a value greater than zero and obtaining a reaction mixture containing less than 7 mole percent demetahalogenated aniline product based on the metahaloaniline product and said demetahalogenated product.

4. A method of preparing metachloroaniline from metachloronitrobenzene which comprises introducing hydrogen into liquid metachloronitrobenzene under superatmospheric pressure at a temperature above 150° C., said liquid containing a catalytic quantity of a catalyst of the following composition:

$$[CuO]_X \cdot [Cr_2O_3]_Y$$

wherein subscripts X and Y are any value from 0 to 1 inclusive, and at least one of said subscripts is a value greater than zero and obtaining a reaction mixture containing less than 7 mole percent aniline based on the metachloroaniline and aniline products.

5. The method of preparing a metahaloaniline from its corresponding meta halonitrobenzene which comprises passing hydrogen and a gaseous metahalonitrobenzene through a bed of catalyst at a temperature above 180° C., said catalyst having the following composition:

$$[CuO]_X \cdot [Cr_2O_3]_Y$$

wherein X and Y are any value from 0 to 1 inclusive, and at least one of said subscripts is a value greater than zero and obtaining a reaction mixture containing less than 7 mole percent demetahalogenated aniline product based on the metahaloaniline and said demetahalogenated product.

6. The method of preparing a metachloronitrobenzene from its corresponding metachloroaniline which comprises passing hydrogen and gaseous metachloronitrobenzene through a bed of catalyst at a temperature above 180° C., said catalyst having the following composition:

$$[CuO]_X \cdot [Cr_2O_3]_Y$$

wherein X and Y are any value from 0 to 1 inclusive, and at least one of said subscripts having a value greater than zero and obtaining a reaction mixture containing less than 7 mole percent demetachlorinated aniline product based on the metachloroaniline and said demetachlorinated product.

7. The method of preparing metachloroaniline from metachloronitrobenzene which comprises passing a gaseous mixture of hydrogen and metachloronitrobenzene through a bed of catalyst at a temperature above 180° C., said catalyst having the following composition:

$$[CuO]_X \cdot [Cr_2O_3]_Y$$

wherein X and Y are any value from 0 to 1 inclusive and at least one of said subscripts is a value greater than 0, and obtaining a reaction mixture containing less than 7 mole percent aniline based on the aniline and metachloroaniline produced by said method.

8. A method of preparing a metachloroaniline from its corresponding metachloronitrobenzene which comprises treating a metachloronitrobenzene with at least 3 moles of hydrogen per mole of said metachloronitrobenzene at a temperature from 150° C. to 400° C. in the presence of a catalytic quantity of a catalyst having the following composition:

$$[CuO]_X \cdot [Cr_2O_3]_Y$$

wherein X and Y are any value from 0 to 1 inclusive and at least one such subscript is a value greater than 0, and obtaining reaction mixture containing less than 7 mole percent aniline based on aniline and the metachloroaniline produced.

9. The method of preparing metachloroaniline from metachloronitrobenzene which comprises passing hydrogen into a liquid body containing metachloronitrobenzene and a lower monohydric alcohol containing up to 10 carbon atoms at a temperature from 150° C. to 400° C. under a superatmospheric pressure of at least about 400 pounds per square inch gauge, said liquid body containing a catalytic quantity of a catalyst having the following composition:

$$[CuO]_X \cdot [Cr_2O_3]_Y$$

wherein X and Y are any value from 0 to 1 inclusive and at least one such subscript is a value greater than 0, and recovering a reaction mixture which contains less than 7 mole percent aniline based on the aniline and metachloroaniline produced.

10. The method of claim 9 wherein at least 3 moles of hydrogen per mole of metachloronitrobenzene in said liquid media is employed.

References Cited in the file of this patent
UNITED STATES PATENTS

| | | |
|---|---|---|
| 1,845,280 | Jaeger | Feb. 16, 1932 |
| 1,964,000 | Lazier | June 26, 1934 |
| 2,137,407 | Lazier | Nov. 22, 1938 |
| 2,526,913 | Teeters | Oct. 24, 1950 |
| 2,631,167 | Werner | Mar. 10, 1953 |

UNITED STATES PATENT OFFICE
Certificate of Correction

Patent No. 2,791,613                                                            May 7, 1957

Blaine O. Pray et al.

It is hereby certified that error appears in the printed specification of the above numbered patent requiring correction and that the said Letters Patent should read as corrected below.

Column 1, line 42, for "$[CuO]_x[Cr_2O_3]_Y$" read —$[CuO]_x \cdot [Cr_2O_3]_Y$—; line 68, for "to a" read —to at—; columns 7 and 8, Table IV, under the heading "Hours of Operation" for Infra-red Analysis:
                    Metachloroaniline, Percent
                    Metachloronitrobenzene, Percent read Infra-red Analysis:
                    Metachloronitrobenzene, Percent
                    Metachloroaniline, Percent column 8, line 17, for "of said" read —and said—.

Signed and sealed this 24th day of September 1957.

[SEAL]

Attest:
KARL H. AXLINE,                                                  ROBERT C. WATSON,
*Attesting Officer.*                                                        *Commissioner of Patents.*